United States Patent [19]

Williams, Jr. et al.

[11] 4,306,154
[45] Dec. 15, 1981

[54] DOSIMETER

[75] Inventors: Edward F. Williams, Jr., Springfield; John B. Byer, Alexandria; Burton J. Thompson, Woodbridge, all of Va.

[73] Assignee: The United States of America as represented by the Secretary of the Army, Washington, D.C.

[21] Appl. No.: 122,962

[22] Filed: Feb. 20, 1980

[51] Int. Cl.³ .............................................. G01T 1/16
[52] U.S. Cl. .................................................. 250/376
[58] Field of Search ....................... 250/376, 377, 378

[56] References Cited

U.S. PATENT DOCUMENTS

| | | | |
|---|---|---|---|
| 2,634,374 | 4/1953 | Shonka | 250/376 |
| 2,638,551 | 5/1953 | Landsverk et al. | 250/376 |
| 2,648,777 | 8/1953 | Landsverk | 250/376 |
| 2,687,480 | 8/1954 | Shonka et al. | 250/376 |
| 2,793,297 | 5/1957 | Siebentritt, Jr. et al. | 250/378 |
| 3,628,019 | 12/1971 | Jackson | 250/376 |
| 3,663,504 | 5/1972 | Sturm et al. | 250/376 |
| 3,993,950 | 11/1976 | Piltingsrud | 250/378 |
| 4,019,058 | 4/1977 | Kronenberg et al. | 250/376 |

OTHER PUBLICATIONS

U.S. Atomic Energy Commission, Oak Ridge, Tennessee, Ryerson Pocket Meter, MDDC-886, 1947.

Primary Examiner—Davis L. Willis
Attorney, Agent, or Firm—William G. Gapcynski; Arthur I. Spechler; Werten F. W. Bellamy

[57] ABSTRACT

The construction of a direct reading, ionization chamber dosimeter is almost exclusively of thermoplastic material. Except for an electrometer frame and switch contacts, the dosimeter comprises components of injection molded thermoplastic material. The dosimeter barrel and most of the structural components are made from either electrically conducting polycarbonate or non-conducting polycarbonate. Optical parts and lenses are formed from transparent plastic materials. The ionization chamber is made from polypropylene loaded with carbon black. The light-weight plastic construction of the dosimeter renders it relatively insensitive to mechanical shock and causes it to interact with ionizing radiation in a manner substantially similar to animal tissue or human flesh.

7 Claims, 9 Drawing Figures

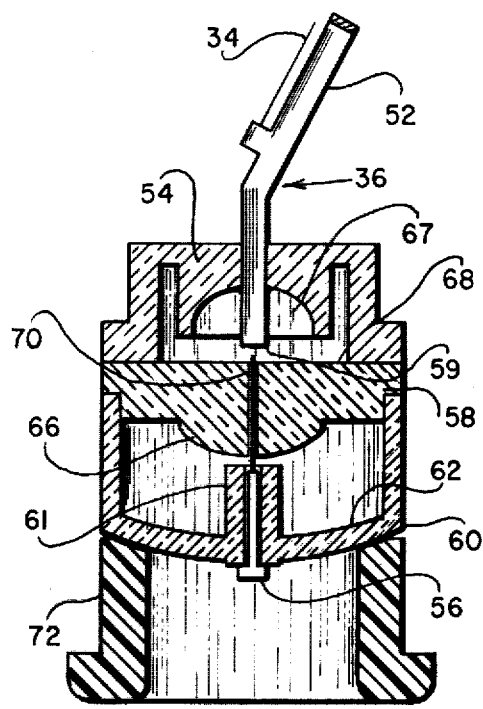
FIG. 2
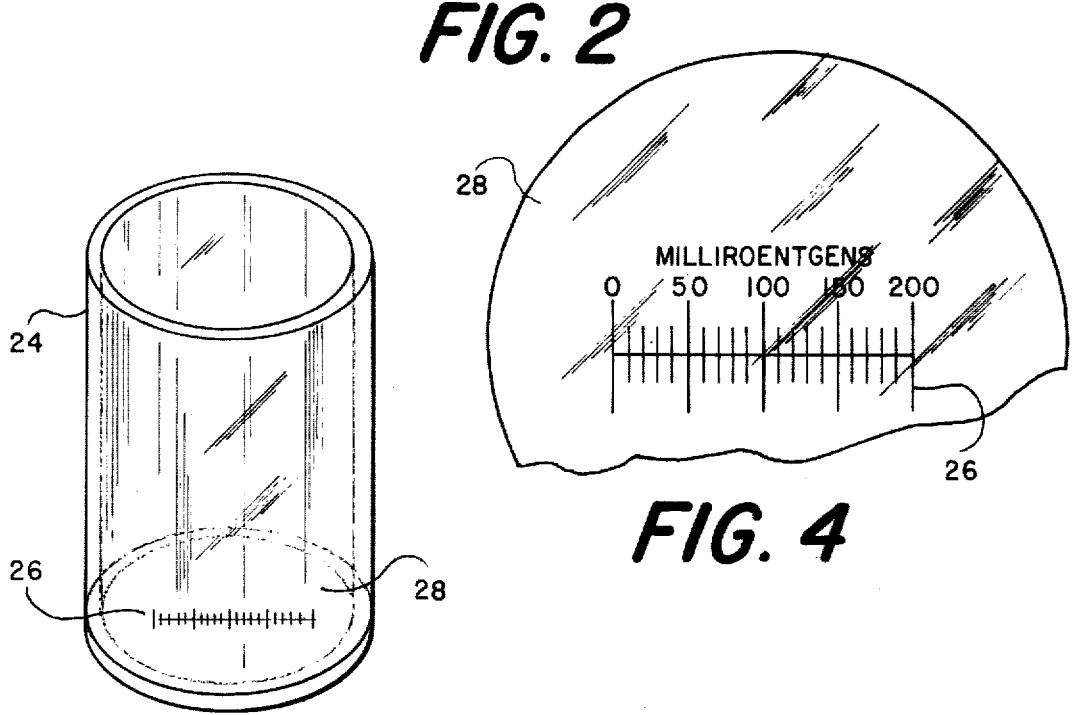
FIG. 3
FIG. 4

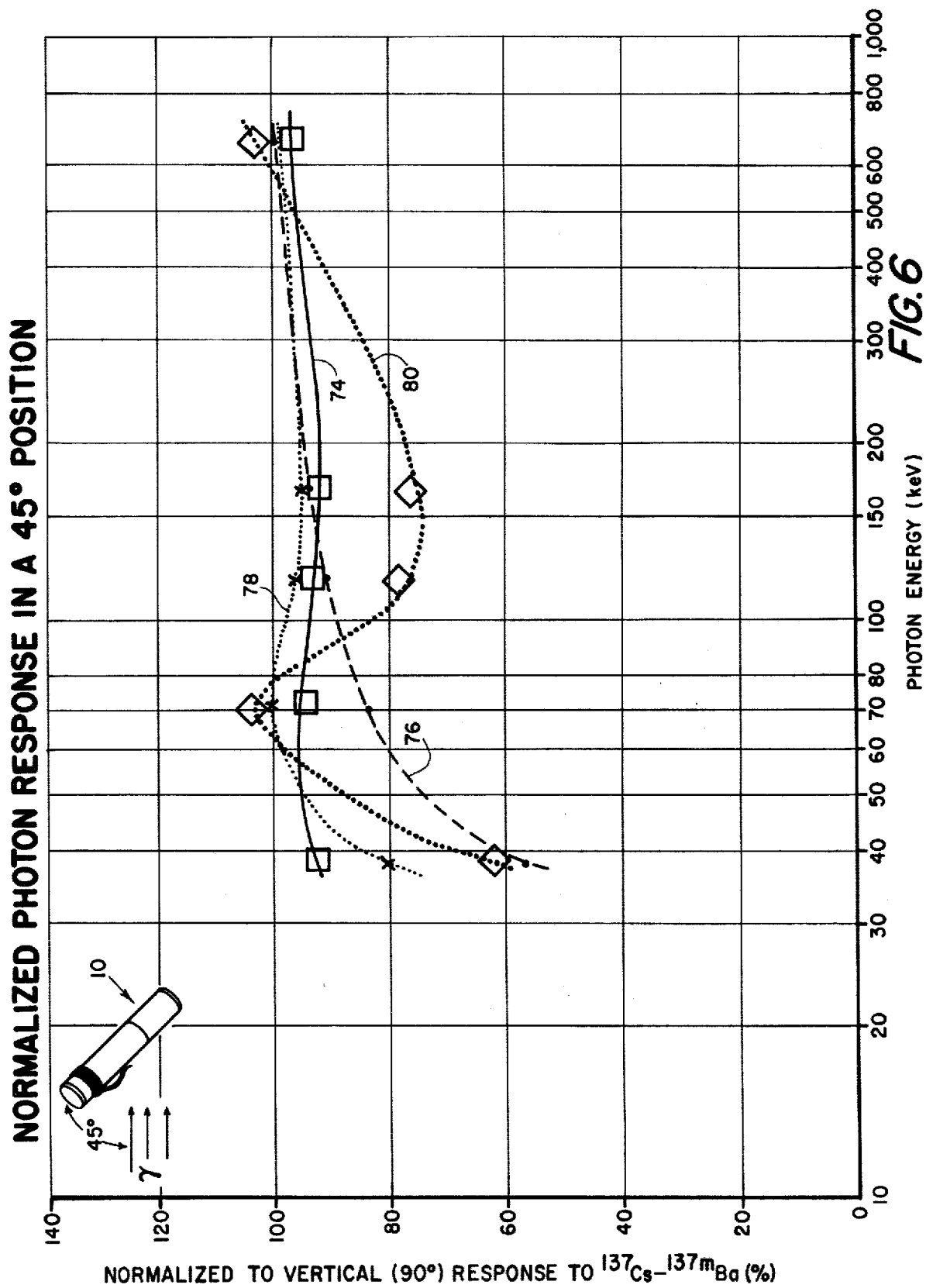

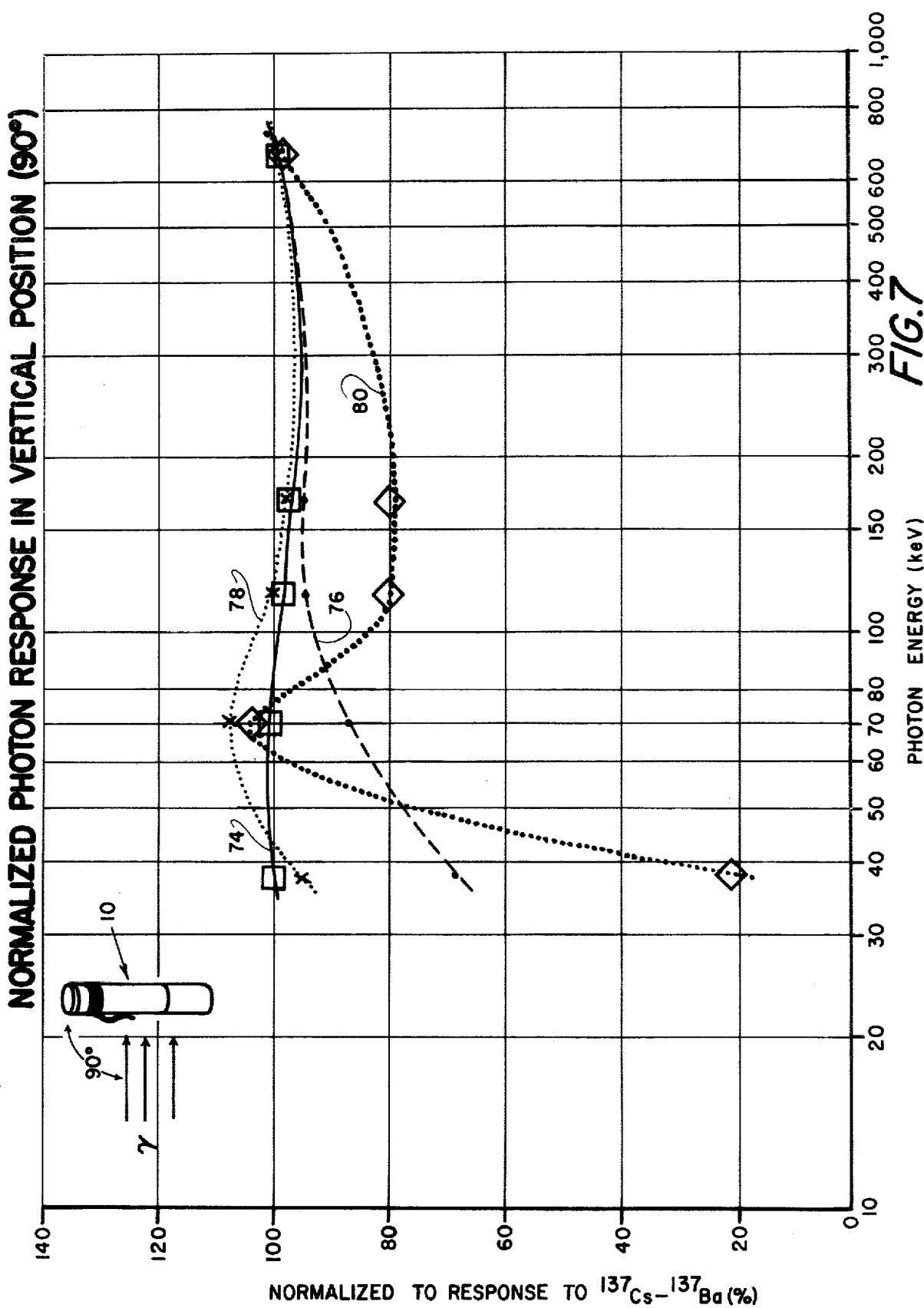

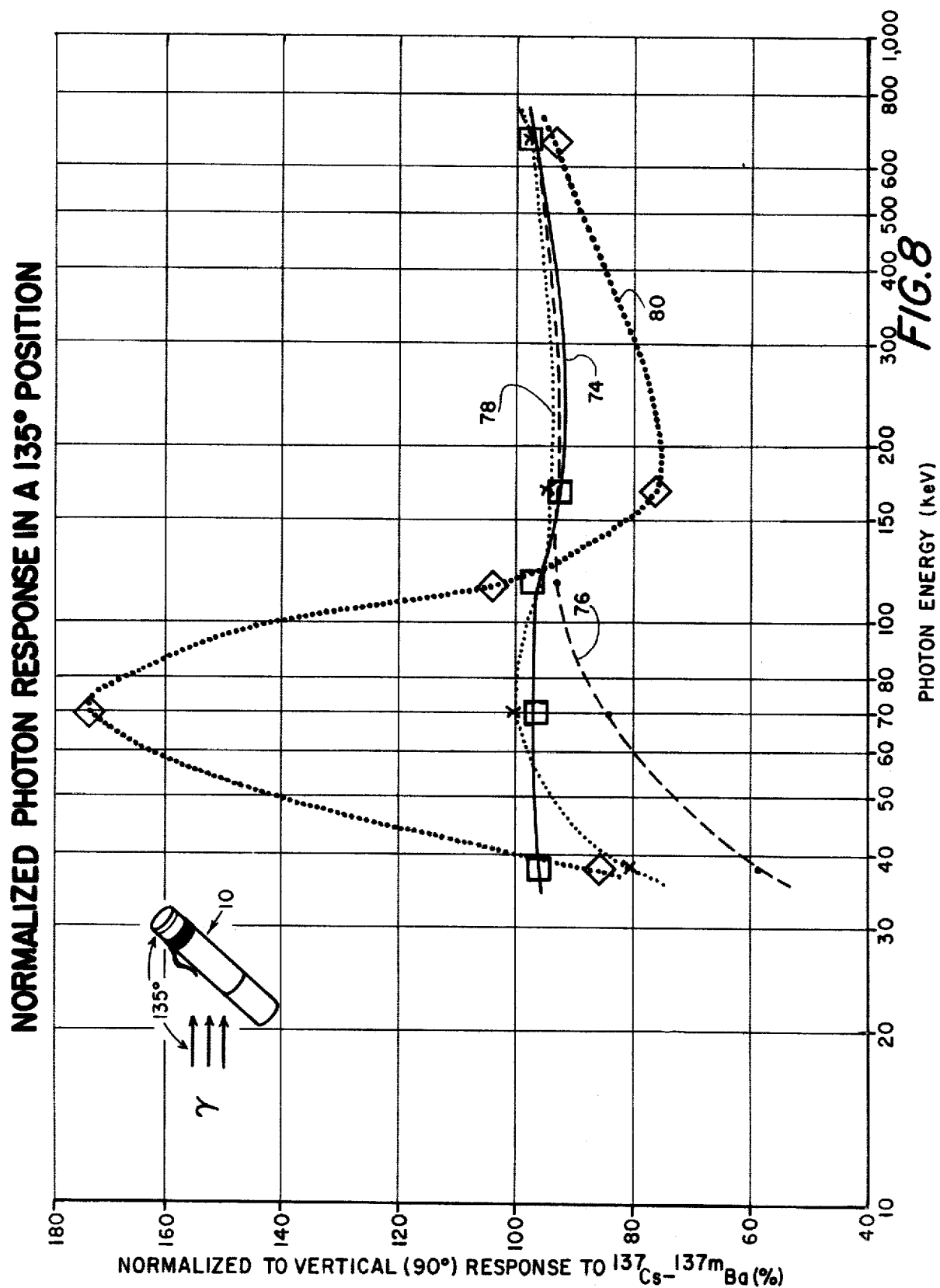

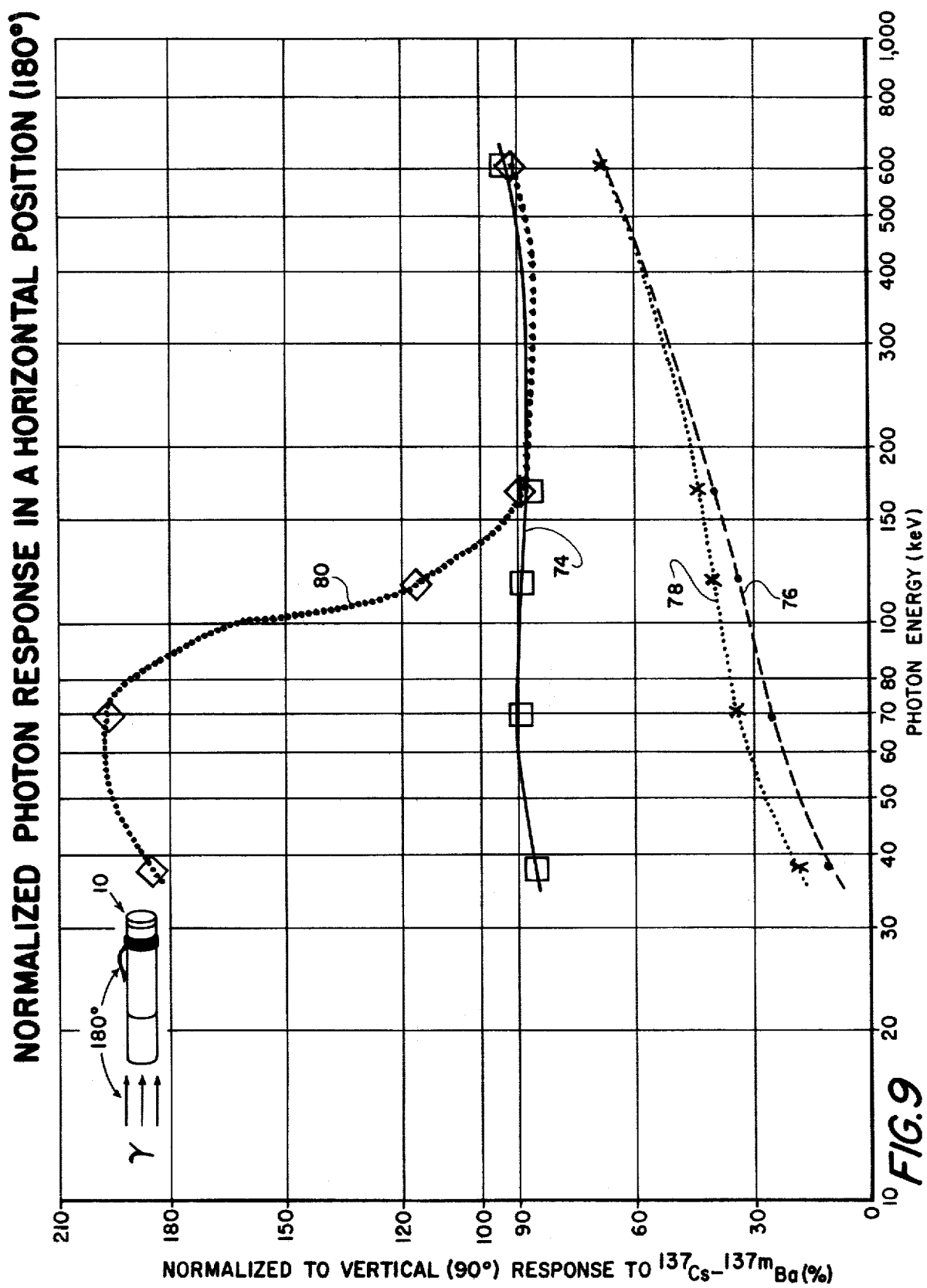

DOSIMETER

RIGHTS OF THE GOVERNMENT

The invention described herein may be manufactured and used by or for the Government of the United States of America for all governmental purposes without the payment of any royalties.

BACKGROUND OF THE INVENTION

This invention relates generally to a portable ionizing, radiation-measuring device of the type used to measure the amount of x-ray and gamma radiation exposure a person receives over a period of time. More particularly, the invention relates to an improved direct reading dosimeter comprised substantially of special plastic material.

The health of personnel handling radioactive materials may be jeopardized if an amount of ionizing radiation of either the electromagnetic or particulate type to which an individual is exposed exceeds that which is permissible. Similar measurements are necessary for measuring the exposure of emergency personnel and the general public to radioactive fallout from the detonation of nuclear weapons, or in the event of a large scale accident at a nuclear power plant or laboratory. The preferred method of measuring these exposures is with a direct reading dosimeter or exposure meter. These devices have an ionization chamber and a fiber electrometer which are externally charged electrically. Incident ionizing radiation passing through the ionization chamber discharges both the ionization chamber and the electrometer. The fiber movement of the electrometer resulting from this discharge is proportional to the amount of ionization produced in the air inside the ionization chamber by radiation passing through it. By using an optical system to measure the amount of movement of the electrometer fiber, an individual wearing the dosimeter on his person is able to accurately determine his own exposure to this radiation. Some of the prior-art dosimeters, because of their relatively heavy weight, have not been entirely successful due to the problem of keeping the fiber position from moving when the instrument is accidentially dropped or subjected to mechanical shock. In many cases when this occured, the fiber position changed, and produced a large increase or decrease in the measurement. Some attempts to correct this problem resulted in a design that could not be charged externally at temperatures below 4° C. This inability to charge the dosimeter can create problems in field applications where charging must be performed outdoors in cold weather.

Another serious problem encountered in prior-art dosimeters is that the response of the electrometer fiber to ionizing radiation is dependent on the direction in which this radiation is impinging on the ionization chamber. Hence, the radiation response is not only dependent on the energy of the electromagnetic radiation but is also dependent on the direction of the radiation.

Many prior-art and dosimeters were of metal and glass. The metals used were usually aluminum alloys. Most of the optical parts were glass. Consequently, metal to glass seals were used, and extensive electro plating or anodizing of various parts to protect their surfaces from oxidation were necessary. Hence, the prior-art processes of dosimeter manufacturing were relatively expensive.

SUMMARY OF THE INVENTION

Except for an electrometer frame and switch contacts, the improved dosimeter of the present invention consists of plastic material, such as injection molded thermoplastic material. The components of the dosimeter are disposed within a tubular plastic barrel, comprising upper and lower plastic sections. The upper section of the barrel comprises electrically insulating plastic, and the lower section of the barrel comprises electrically conducting plastic. This construction provides a dosimeter that is relatively light in weight so that it can be dropped from a height of about four feet without substantially changing the reading of the electrometer. Also, since the plastic material of the dosimeter consists almost entirely of chemical elements (C, H, O) with relatively low atomic numbers, the dosimeter interacts with ionizing radiation in a manner substantially similar to animal tissue or human flesh. The novel plastic construction of the improved dosimeter is relatively inexpensive to manufacture and renders it substantially insensitive to the direction of impinging radiation.

BRIEF DESCRIPTION OF THE DRAWINGS

FIG. 2 is an enlarged cross-sectional view of a portion of the lower section of the dosimeter, including the electrometer and the charging pin, taken along the plane 2—2 of FIG. 1 and viewed in the direction indicated by the arrows.

FIG. 3 is an enlarged perspective view of an eyepiece cup of the dosimeter for holding an eyepiece lens and spacer and for displaying a scale used to measure the electrometer fiber movement.

FIG. 4 is an enlarged view of the scale shown in FIG. 3.

FIGS. 5, 6, 7, 8 and 9 are graphs comparing the normalized photon responses of three prior-art dosimeters to the response of the improved dosimeter of the present invention to x-ray and gamma radiation impinging upon the dosimeter at 0°, 45°, and 90°, 135°, and 180°, respectively, as a function of the photon energy of the impinging radiation.

DESCRIPTION OF THE PREFERRED EMBODIMENT

Figure 1:
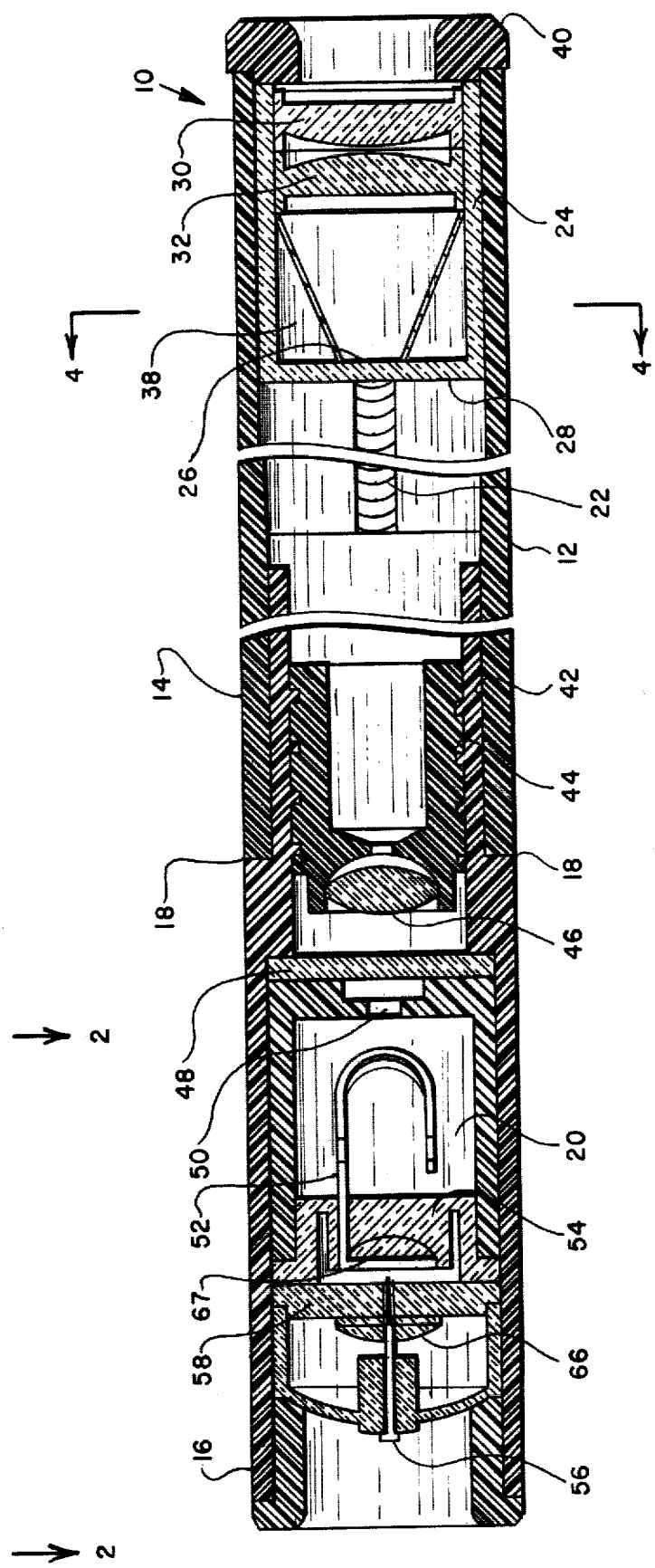
FIG. 1 is a longitudinal cross-sectional view of the improved dosimeter.
Figure 5:
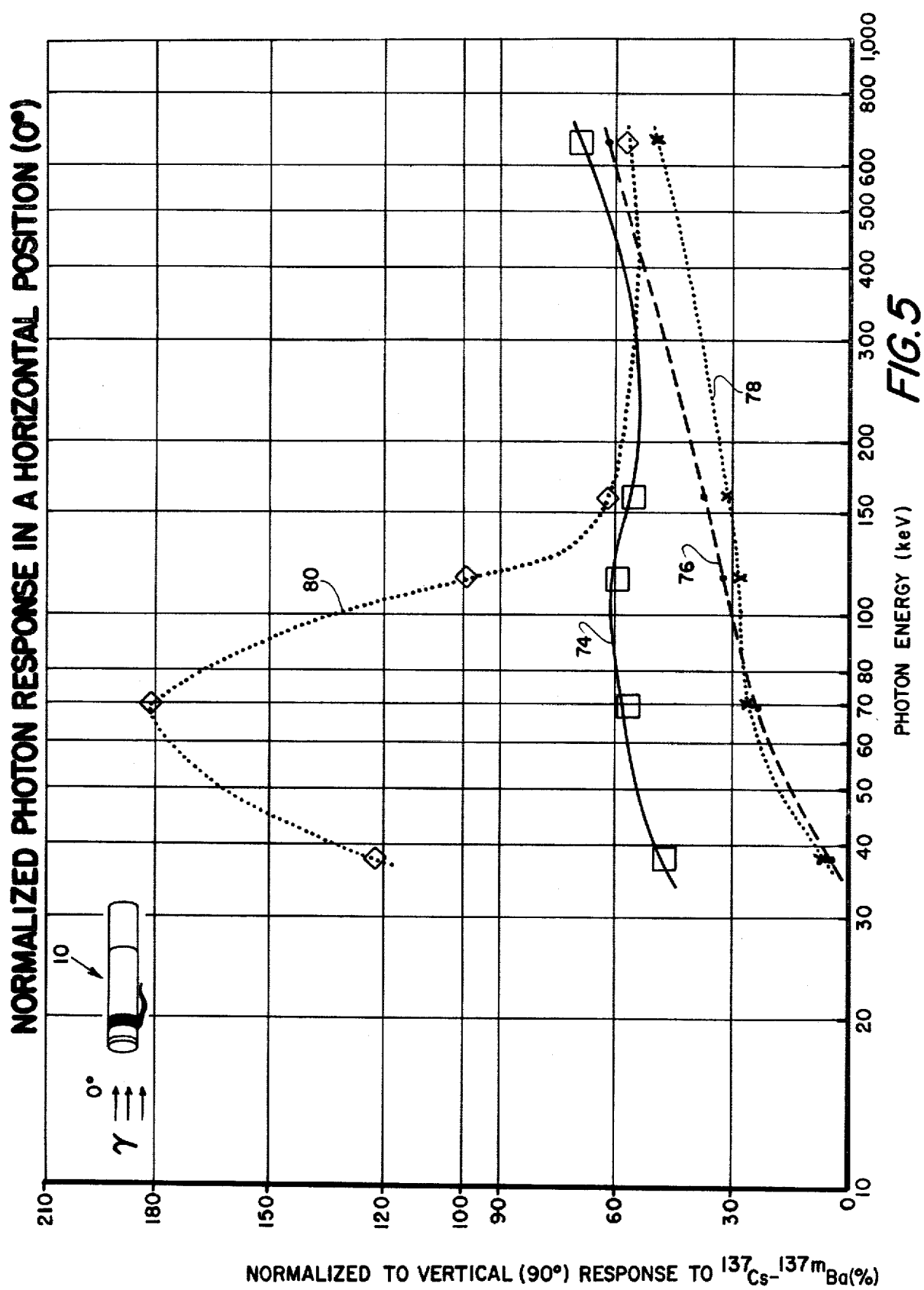

Referring now to FIG. 1 of the drawing, there is shown an improved dosimeter 10, in accordance with the present invention, comprising a tubular shaped casing or barrel 12, having upper and lower sections 14 and 16, respectively. The dosimeter 10 is of a size and shape that can easily be carried in the shirt pocket of a person. The upper section 14 of the barrel, is electrically nonconducting, that is, electrically insulating. The upper section 14 can be molded out of plastic materials, such as glass fiber filled polycarbonate. The glass fiber filled polycarbonate contains between 15 and 25% glass by weight of the plastic and can be obtained, for example, from Fiberite Corporation, Winona, Minn. The lower section 16 of the barrel, can be molded from carbon fiber filled polycarbonate and is electrically conducting. The carbon fiber filled polycarbonate contains between 15 and 25% carbon fiber by weight of the plastic, and can also be obtained from the Fiberite Corporation.

Carbon black can be substituted for the carbon fiber. The upper and lower sections 14 and 16 are welded together ultrasonically and glued chemically as at 18, as a final step of the dosimeter assembly.

An ionization chamber 20 is disposed within the lower section 16 of the barrel 12. The ionization chamber 20 is molded from materials such as carbon black filled polypropylene to make it highly conductive. The carbon black filled polypropylene contains between 20 and 30% carbon black by weight of the plastic, and can be obtained, for example, from the Plastic Trading Co., Winona, Minn. By the use of these materials, the dosimeter 10 is responsive substantially uniformly to a wide range of ionizing electromagnetic radiation energies regardless of the direction of the impinging radiation. The response of the dosimeter 10 is also similar to the response of human tissue to low energy neutron radiation. This is because the parts of the dosimeter 10 that react with ionizing radiation comprise elements that have very low atomic numbers (i.e., C, H, O) and these parts are substantially the equivalent of animal tissue or human flesh.

The upper section 14 of the barrel 12, which has three support ribs 22 (only one of which is shown in FIG. 1) to stengthen the barrel, positions an eyepiece cup 24 therein. The eyepiece cup 24 is transparent plastic and can be molded from materials such as "Lucite" acrylic (Dupont resin 140). An enlarged illustration of the cup 24 is shown in FIG. 3. A scale 26 to measure the amount of radiation exposure in milliroentgens is molded into the acrylic resin plastic base 28 of the cup 24. An enlarged view of the scale 26 with a measuring range of 200 milliroentgens is illustrated in FIG. 4. The scale 26 is molded into the base 28 of the cup 24 by means of a molding technique that produces raised images. When light passes through the plastic material of the cup 24, the refraction of light by the raised images makes the scale 26 visible. The cup 24 positions eyepiece lenses 30 and 32 of an optical system required to visualize an image of a fiber 34 of an electrometer 36 (FIG. 2) and to measure its movement across the scale 26. The function and structure of the electrometer 36 is described in U.S. Pat. No. 3,993,950 which is hereby included by reference. The first eyepiece lens 30 is convex at the bottom and the second eyepiece lens is convex at the top. Both of these lenses are molded from materials such as "Lucite" acrylic resin and are positioned at the proper distance from the scale 26 by a transparent "Lucite" acrylic spacer 38. The three component parts can be welded together by means of ultrasonic welding. These parts are placed in the eyepiece cup 24 and sealed into the top of the upper section 14 of the barrel 12 by means of a cap 40 molded from materials such as glass fiber filled polycarbonate. The cap 40 is fixed into position ultrasonically by welding and chemically by epoxy resin.

The lower section 16 of the barrel 12 has an extension, as at 42, that is internally threaded. An objective lens holder 44 is externally threaded and is also molded from materials such as glass filled polycarbonate. This construction permits an objective lens 46 that is molded from acrylic resin plastic to be positioned precisely to visualize the image of the fiber 34 (FIG. 2) of the electrometer 36. The objective lens 46 is welded into the objective lens holder 44 ultrasonically. Between the objective lens 46 and the top of the ionization chamber 20 is an acrylic resin window 48 that provides a top air seal of the ionization chamber 20. This window 48 also prevents the establishment of an extra cameral volume in the air space between the lens 46 and the top of the ionization chamber 20. The window 48 is transparent to allow the image of the fiber 34 to the electrometer 36 to be seen through a hole 50 at the top of the chamber 20. An aluminum frame 52, as of 1100 aluminum, of the electrometer 36 is molded into an electrical insulator 54. The insulator 54 is molded from transparent polystyrene alpha methylstyrene copolymer, Monsanto Cerex 250.

Referring now to FIG. 2 of the drawing, there is shown an enlarged cross-sectional view of the electrometer 36 with its insulator 54, illustrating how a stainless steel charging pin 56, as of 303 stainless steel, is connected through an electrostatic shield 58 to make a contact with the contact end 59 of the electrometer frame 52. The charging pin 56 is held in an open contact position by means of a plastic diaphragm 60. The diaphram 60 is transparent and made from clear polycarbonate. The diaphragm 60 is a thin membrane that stretches across the diameter of the lower section 16 of the barrel 12. The diaphragm 60 is formed with a thick cylindrical section 61 at its center through which the charging pin 56 passes. The charging pin 56 is sealed into the diaphragm 60 with an epoxy resin. Between the upper surface 62 of the diaphragm 60 and the contact end 59 of the electrometer 36 is the electrostatic shield 58. The electrostatic shield 58 prevents any electrostatic field on the charging pin 56 from influencing the position of the electrometer fiber 34, after externally charging the dosimeter 10. The shield 58 has a shaped lens 66 to collect the light passing through the diaphragm 60 and to focus the light onto a lens 67 formed on the base of the insulator 54. The shield 58 is constructed of acrylic resin plastic with a light-transmitting coating 68 of sputtered platinum on the side toward the insulator 54. The shield 58 and lens 66 has a hole 70 in the center to allow the charging pin 56 to pass through without touching it. The insulator 54, the ionization chamber 20, and the electrostatic shield 58 are press fit together, and the diaphragm 60 is sealed to the electrostatic shield 58 by a press fit and epoxy resin. This assembly is loaded into the lower section 16 of the barrel 12 with the diaphragm 60 sealed to the sides of the barrel with epoxy resin. A grounding ring 72 made of carbon fiber loaded polycarbonate is fixed into the lower end of the barrel 12 and sealed using both ultrasonic welding and epoxy resin. The diaphragm 60 and the grounding ring 72 provide the lower air seal for the ionization chamber 20.

To place an electrical charge on the electrometer 36, a charging contact (not shown) is inserted through the center of the grounding ring 72. The charging contact pushes against the charging pin 56, which, in turn, pushes against the end contact 59 of the electrometer frame 36. A tube (not shown) that holds the charging contact is electrically isolated from the charging contact and is at an electrical ground. The grounding ring 72 makes contact with this tube, providing means for the electrostatic charge on the ionization chamber 20 and/or the lower section 16 of the barrel to flow to ground through this grounding ring 72 when the electrometer 36 is being charged.

Referring now to FIGS. 5, 6, 7, 8, and 9 there are shown graphs plotted on a semi-log scale which compare the normalized ionizing radiation response, graph 74, of the improved dosimeter 10 to the normalized ionizing radiation responses, graphs 76, 78, and 80, of three polular prior-art dosimeters to photon energy impinging upon the dosimeter at 0°, 45°, 90°, 135°, and 180°, respectively. The direction of the impinging ionizing radiation energy, represented by the Greek letter gamma, is shown in the upper left-hand corner of each of the FIGS. 5, 6, 7, 8, and 9.

It is seen that the response 74 of the novel dosimeter 10 to ionizing radiation energy, measuring in kiloelectron volts, is substantially more uniform in each of the FIGS. 5, 6, 7, 8, and 9, than the responses 76, 78, and 80, when normalized to the vertical (90°) response to 137 Cesium. The FIGS. 5, 6, 7, 8, and 9 illustrate that the novel dosimeter 10 is relatively less sensitive, that is, more uniformly responsive and accurate, to the direction of impinging energy than three popular prior-art dosimeters.

Thus, there has been described and illustrated an improved, easily repairable, relatively light-weight dosimeter which utilizes special plastic materials to render it less sensitive to the direction of impinging radiation. The improved dosimeter has the ability to withstand relatively large mechanical shocks without destroying its registered response. In addition, the construction of this device with plastic materials results in a reduction in the cost of both construction materials and labor in a mass production process. The plastic construction also causes the dosimeter to interact with ionizing radiation in a manner substantially similar to human flesh. Although this invention has been disclosed and illustrated with reference to a particular application, the invention is adaptable to numerous other applications which will be apparent to persons skilled in the art.

We claim:

1. In a dosimeter of the type comprising a tubular plastic barrel, an ionization chamber comprising an electrometer having a frame, optical means for viewing said electrometer, and means for charging said electrometer including a charging pin, all disposed within said barrel, the improvement comprising:
    said ionization chamber except for said frame, said charging means except for said charging pin, and said optical means are of plastic materials,
    said barrel comprises an electrically insulating upper plastic section comprising between 15% and 25% glass or glass fiber by weight of the plastic, and a lower electrically conductive plastic section comprising between 15% and 25% of either carbon black or carbon fiber by weight of the plastic sealed to said upper section, whereby said dosimeter is relatively light in weight, and is comprised substantially of plastic materials of chemical elements with relatively low atomic numbers so as to interact with ionizing radiation in a manner substantially similar to animal tissue or human flesh.

2. In a dosimeter of the type described in claim 1:
    said upper section of said barrel comprises glass fiber filled polycarbonate plastic, and
    said lower section of said barrel comprises polycarbonate plastic filled with either carbon black or carbon fiber.

3. In a dosimeter of the type described in claim 2:
    one portion of said optical means includes a scale for reading said electrometer and is disposed within said upper section of said barrel, and
    said ionization chamber and another portion of said optical means are disposed in said lower section of said barrel.

4. In a dosimeter of the type described in claim 3:
    said upper and said lower sections comprise thermoplastic materials that are sealed to each other with an ultrasonic weld and/or epoxy resin.

5. In a dosimeter of the type described in claim 1:
    said ionization chamber comprises a tubular member of carbon black filled polypropylene plastic disposed within said lower section of said barrel,
    an electrical insulator of polystyrene alpha methylstyrene copolymer disposed within said tubular member to support said electrometer,
    said frame of said electrometer having an end contact extending through said insulator and spaced from said charging pin, and
    resilient means supporting said charging pin close to said end contact of said frame, whereby said charging pin can make electrical contact with said end contact when said resilient means are stretched.

6. In a dosimeter of the type described in claim 5:
    said resilient means comprises plastic material of transparent polycarbonate.

7. In a dosimeter of the type described in claim 5:
    said polypropylene plastic comprises between 20 and 30% carbon black by weight of the polypropylene plastic.

* * * * *